Figure 1:
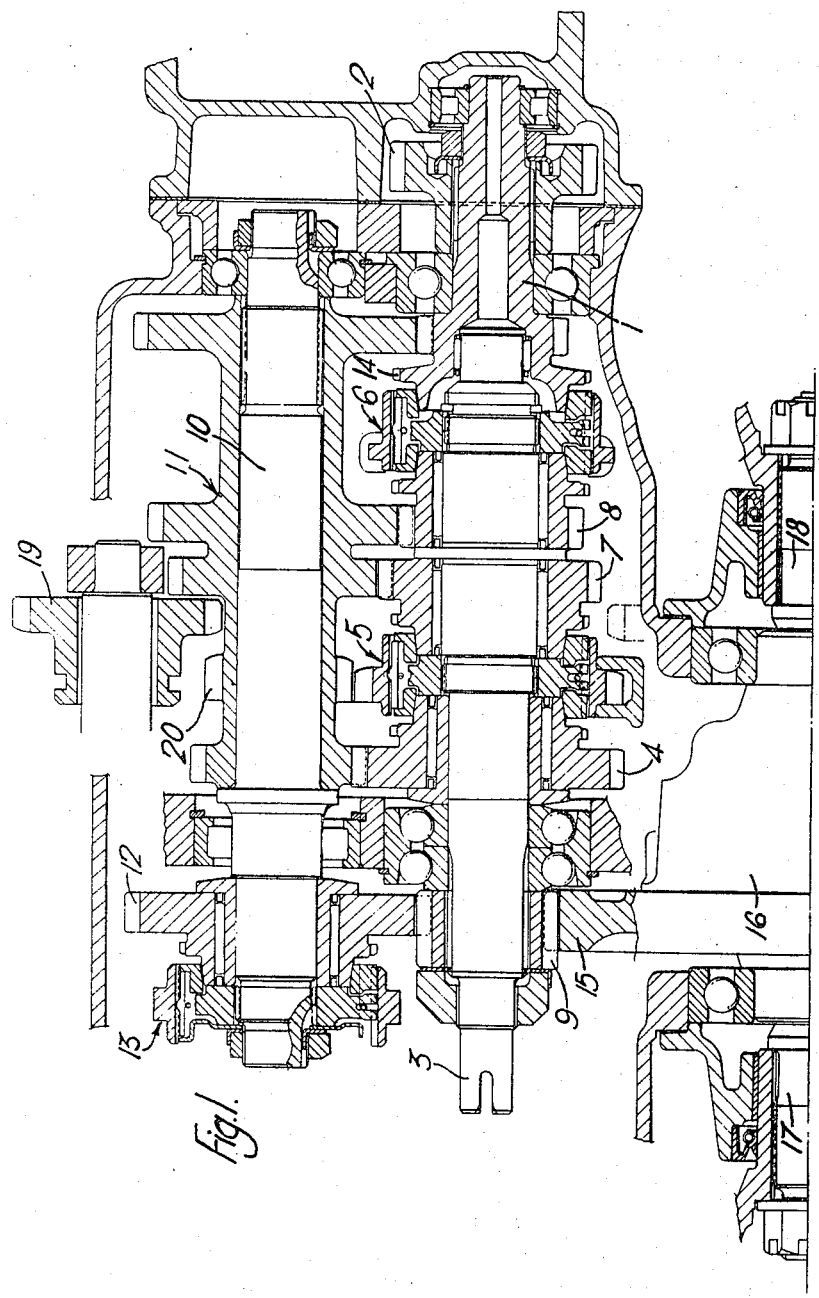

March 14, 1967 H. GARDNER 3,308,673
VARIABLE-SPEED POWER TRANSMISSION MECHANISMS
Filed Nov. 3, 1964 2 Sheets-Sheet 1

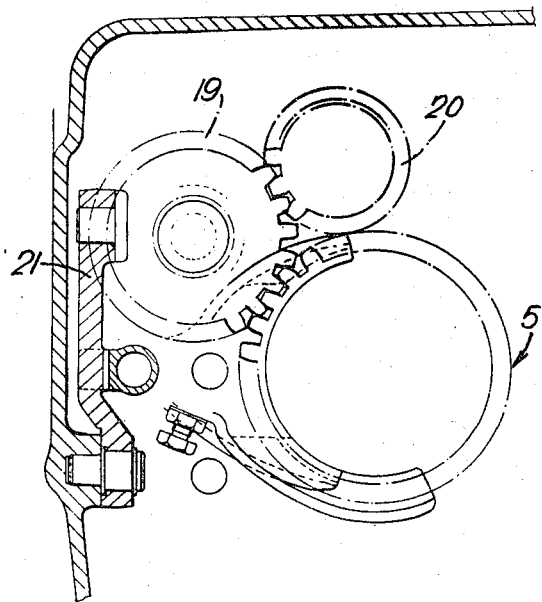

United States Patent Office 3,308,673
Patented Mar. 14, 1967

3,308,673
VARIABLE-SPEED POWER TRANSMISSION MECHANISMS
Harry Gardner, Barnt Green, England, assignor to The Austin Motor Company Limited, Birmingham, England
Filed Nov. 3, 1964, Ser. No. 408,481
1 Claim. (Cl. 74—333)

This invention relates to variable-speed power transmission mechanisms for motor vehicles of the kind having a transverse power unit which incorporates, en bloc, engine, clutch, layshaft-type change-speed gearing, and a final-drive differential gear assembly that is driven by a pinion on the third-motion shaft of the change-speed gearing.

According to this invention a motor vehicle of the kind specified has the change-speed gearing arranged to afford five forward speeds; and the fifth-speed gear, which, when engaged, provides an overdrive, is coaxial with the layshaft; is in constant mesh with the final-drive pinion; and is arranged to be coupled to the layshaft by synchromesh coupling means effecting its engagement.

By virtue of the feature that the overdrive gear meshes with the final-drive pinion, a five-speed gearbox of very compact and economical construction is afforded by the invention. In its preferred embodiment, synchromesh mechanism is provided for all the forward speeds; and in the case of the fourth speed the drive is direct from the first-motion shaft to the third-motion shaft. The overdrive fifth-speed gear, with its associated synchromesh coupling means, is mounted on the layshaft adjacent to one end thereof.

Referring to the accompanying drawings:

FIGURE 1 is a longitudinal section of a layshaft-type variable-speed power transmission mechanism in accordance with the invention; and FIGURE 2 is a fragmentary transverse section showing reversing gearing that is incorporated in the mechanism shown in FIGURE 1.

The power transmission mechanism illustrated in FIGURE 1 is designed for a motor vehicle of the kind having a transverse power unit which incorporates, en bloc, engine, clutch, layshaft-type change-speed gearing, and a final-drive differential gear assembly that is driven by a pinion on the third-motion shaft of the change-speed gearing.

The change-speed gearing includes: a first-motion shaft 1, to which the drive from the engine is transmitted by a clutch (not shown) through a gear train which includes a gear 2 splined to the shaft 1; a coaxial third-motion shaft 3, carrying a first-speed wheel 4, two synchromesh coupling devices 5 and 6, a second-speed gear 7, a third-speed gear 8 and a final-drive pinion 9; and a layshaft 10.

The latter, in addition to the normal gear cluster 11, carries a fifth-speed gear 12 which is in constant mesh with the final-drive pinion 9, and which, when coupled to the layshaft 10 by synchromesh coupling means 13 effecting its engagement, affords an overdrive.

The selection and engagement of the overdrive gear 12 may be effected in any convenient manner. For example, if desired, the usual selector and shifter arrangement can be employed by providing a sixth position in the gate of the gear lever (not shown); it being appreciated, of course, that not only the five forward speeds have to be accommodated, but the necessary reverse gear as well.

In the case of the fourth speed the sliding coupling of the synchromesh device 6 engages dog teeth 14 on the first-motion shaft 1, so that the drive is direct from this shaft to the shaft 3.

The pinion 9 is in constant mesh with a gear 15 of a final-drive differential gear assembly 16, the output shafts of which are indicated at 17 and 18 respectively.

The reversing gearing (FIG. 2) follows standard practice, its idler gear 19 being slidable into mesh with a layshaft gear 20 by a shifter 21. It will be appreciated that the reverse idler 19 is shown out of place in FIGURE 1.

I claim:

Variable speed power transmission mechanism for a motor vehicle comprising a unitary power unit arranged transversely of the vehicle and including aligned input and output shafts, a layshaft parallel with said input and output shafts, change-speed gearing connecting said shafts for securing four forward speeds and including a final drive pinion secured to said output shaft, an overdrive pinion coaxially arranged on said layshaft and constantly meshing with said final drive pinion, synchromesh coupling means for connecting said overdrive pinion with said layshaft, and a final drive differential gear assembly having a driving gear in constant mesh with said final drive pinion and having also a pair of output shafts arranged parallel with said input, output and layshafts.

References Cited by the Examiner
UNITED STATES PATENTS

| | | | |
|---|---|---|---|
| 2,267,464 | 12/1941 | Iavelli | 74—359 X |
| 2,316,503 | 4/1943 | Curtis | 74—359 X |
| 2,356,522 | 8/1944 | Kummich | 74—359 |
| 2,518,734 | 8/1950 | Wemp | 74—333 |
| 2,753,728 | 7/1956 | Kelbel | 74—333 X |
| 3,088,336 | 5/1963 | Fodrea | 74—333 X |
| 3,245,278 | 4/1966 | Mattausch | 74—333 |

DAVID J. WILLIAMOWSKY, Primary Examiner.
C. J. HUSAR, Assistant Examiner.